J. NAEF.
EVAPORATOR.
APPLICATION FILED OCT. 1, 1915.
1,167,204. Patented Jan. 4, 1916.
Fig. 1.
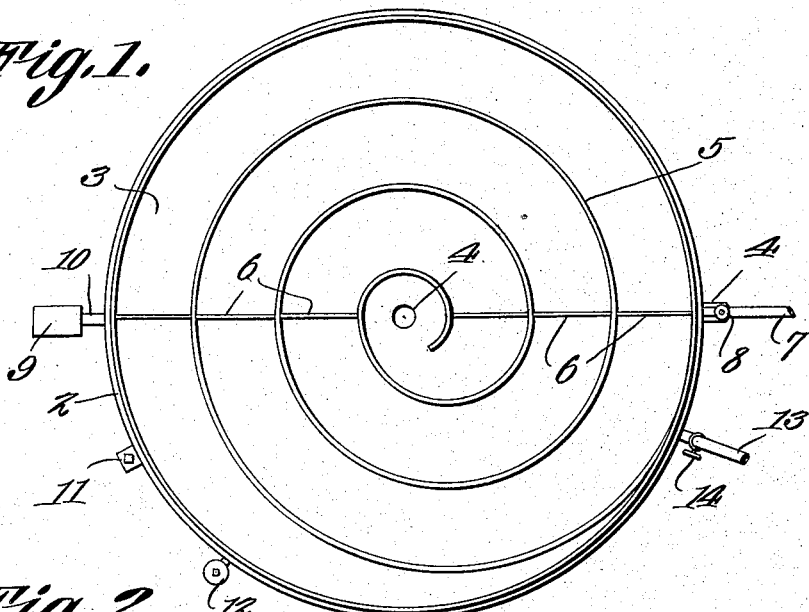
Fig. 2.
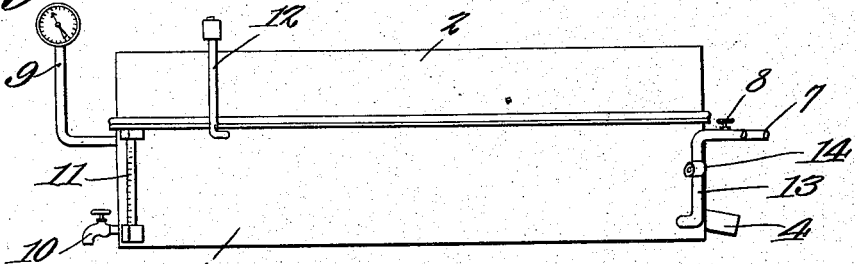
Fig. 3.
Fig. 4.
John Naef
Inventor,
Witnesses
by C. A. Snow & Co.
Attorneys.

UNITED STATES PATENT OFFICE.

JOHN NAEF, OF DERMOTT, ARKANSAS.

EVAPORATOR.

1,167,204.   Specification of Letters Patent.   Patented Jan. 4, 1916.

Application filed October 1, 1915. Serial No. 53,572.

*To all whom it may concern:*

Be it known that I, JOHN NAEF, a citizen of the United States, residing at Dermott, in the county of Chicot and State of Arkansas, have invented a new and useful Evaporator, of which the following is a specification.

The present invention appertains to evaporators, and aims to provide a novel and improved device of that character adapted especially for boiling or evaporating the sap of maple trees to provide the maple syrup, although the device is adapted for use for kindred other purposes.

It is the object of the invention to provide an evaporator whereby a continuous operation is possible, the sap being poured into the evaporator and progressing slowly therein and at the same time being subjected to heat, whereby the process of evaporation ensues, the syrup or denser liquid resulting from the evaporation flowing off in a continuous stream. By means of the present device, therefore, the ordinary method of boiling the sap down in a pan, and then pouring off the syrup, is eliminated, and means is provided in lieu thereof whereby a single evaporator can operate continuously for boiling or heating any amount of sap.

The objects are carried out by a device of simple and inexpensive structure, which nevertheless is practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a plan view of the improved evaporator. Fig. 2 is a side elevation thereof. Fig. 3 is a vertical section. Fig. 4 is a perspective view of a skimmer used with the evaporator.

The invention embodies a boiler or tank 1, preferably although not necessarily of circular outline, and a similarly shaped pan 2 seated or secured upon the rim or upper edge of the boiler 1. The bottom of the boiler or tank is preferably convexed. The pan 2 is of funnel-shape or has a dished bottom 3 sloping from the sides or rim of the pan to the center thereof. The bottom of the pan has an opening or aperture at the center or apex thereof, and an inclined spout 4 is attached to the center or lowest point of the bottom and provides an outlet for the pan extending through one side wall of the boiler 1.

Soldered, welded or otherwise secured upon the bottom 3 of the pan 2 is a spiral-shaped upstanding flange 5 whose outer end is secured to the rim of the pan 2, and whose inner end terminates adjacent the spout or outlet 4 of the pan. This flange provides a spiral trough, the bottom of which is inclined at a small angle, due to the shape of the bottom 3 of the pan, and the sap or liquid which is poured into the outer end of this trough will therefore flow within the trough to the center of the bottom.

In order to retard the flow of the liquid within the spiral trough, one or more radial plates 6 are inserted between the convolutions of the flange 5 and provide means within the respective portions of the trough for regulating the flow of the liquid. This prevents the liquid from flowing too freely through the trough, and holds the liquid within the various portions of the trough sufficiently long to receive the proper amount of heat. The plates 6 are spaced more or less from the bottom 3 of the pan 2 to regulate the flow of liquid under said plates.

Heat is applied to the bottom of the pan by boiling water within the boiler 1, although it will be understood that hot water, steam, or other means may be employed for heating the pan uniformly throughout its area.

As illustrated, a steam supply pipe 7 is attached to one side wall of the boiler 1 adjacent the pan 2, and is provided with a controlling valve 8. This pipe 7 may be connected to any suitable source of steam, whereby steam can be supplied within the boiler for heating the pan. The boiler or tank 1 is equipped with a steam pressure gage 9, a drain cock 10 to enable the tank to be drained, a water level gage 11, and a safety or escape valve 12, the uses of which are obvious. A water supply pipe 13 is attached to one side wall of the tank 1 adjacent the bottom thereof, for supplying water into the tank, when water is used, and the pipe 13 has a controlling valve 14.

Stays 15 are preferably disposed between and secured to the bottom of the tank or boiler and the bottom of the pan 2, for bracing said parts, whereby they will not be bulged or distorted by the steam pressure, when steam is used.

An apertured plate 16 is preferably employed to be run within the spiral trough, for skimming the sap and syrup.

In use, supposing the water within the boiler 1 to be heated, for heating the bottom of the pan 2, the sap is poured into the outer end of the spiral trough, and will flow gradually around the convolutions of said trough. As the sap flows around the trough, it is heated, to cause the evaporation, and thus as the sap flows around the trough it is gradually thickened, the plates 6 impeding the flow of the liquid sufficiently to prevent the too rapid flow thereof. When the liquid reaches the inner end of the trough it is in its finished state, and the syrup will then flow down through the spout 4 and can be caught in a suitable receptacle. The sap can be poured continuously into the outer end of the trough in the proper quantity, and the evaporating process will therefore continue without interruption. This is far superior to the ordinary method of boiling sap, wherein only a limited amount of sap can be boiled in an ordinary pan.

The device is not only useful for making maple syrup, but can be used for divers other purposes for which it is suited.

Having thus described the invention, what is claimed as new is:

1. An evaporator embodying a spiral trough, and means therein for impeding the flow of liquid.

2. An evaporator pan having an upstanding spiral flange upon its bottom providing a spiral trough, an outlet at the inner end of said trough, and means within said trough for impeding the flow of liquid therein.

3. An evaporator pan having a dished bottom and an outlet spout at the center of said bottom, a spiral upstanding flange upon said bottom and extending from the rim of the pan to the central portion of the bottom to provide a spiral trough, and radial plates slipped between the convolutions of said flange to impede the flow of liquid within the trough.

4. An evaporator embodying a boiler, a pan seated thereon having a dished bottom and a spout extending from the center of said bottom through the boiler, and an upstanding spiral flange upon said bottom extending from the rim of the pan to the central portion of the bottom to provide a spiral trough.

In testimony that I claim the foregoing as my own, I have hereto affixed my signature in the presence of two witnesses.

JOHN NAEF.

Witnesses:
 E. SCHNELZ,
 E. O. SWINK.